Feb. 3, 1942.  J. S. FORSTER ET AL  2,271,688

VARIABLE SPEED FRICTION DRIVE

Filed Jan. 8, 1941

WITNESSES:
Wm. B. Sellers.
Wm. J. Ruano

INVENTORS
John S. Forster and
Seymour W. Herwald.
BY
Paul E. Friedemann
ATTORNEY Patented Feb. 3, 1942

2,271,688

UNITED STATES PATENT OFFICE 2,271,688

VARIABLE SPEED FRICTION DRIVE

John S. Forster, Pittsburgh, and Seymour W. Herwald, Wilkinsburg, Pa., assignors to Westinghouse Electric & Manufacturing Company, East Pittsburgh, Pa., a corporation of Pennsylvania Application January 8, 1941, Serial No. 373,681

10 Claims. (Cl. 74—198)

Our invention relates to a variable speed friction drive and is more specifically concerned with a novel spring bias ball assembly used as a transmitting medium between the driving and driven members.

An object of our invention is to provide a friction transmitting means between driving and driven members which is of such nature as to allow the driving and driven members to be rigidly mounted at a fixed distance from each other so as to be clearly devoid of wobbling movements.

Another object of our invention is to provide a novel type of spring-pressed ball assembly between driving and driven members of a variable speed friction drive which is simple, compact, inexpensive to manufacture, and yet positive and highly reliable in operation, giving continuous contact between all the elements of the drive.

Other objects and advantages will become more apparent from a study of the following specification when considered in conjunction with the accompanying drawing, in which.

In the usual application of a disk, a ball or balls, and a cylinder as a variable speed device, springing is applied to the disk in order to get sufficient driving pressure between the various driving parts. This method runs into quite bulky equipment if it is desired to keep the disk from wobbling for all positions of the ball assembly along the disk radius.

What is proposed in accordance with our invention is that the necessary springing be placed in the ball assembly so that the disk can be made rigid axially and, consequently, its construction greatly simplified.

Figure 1:
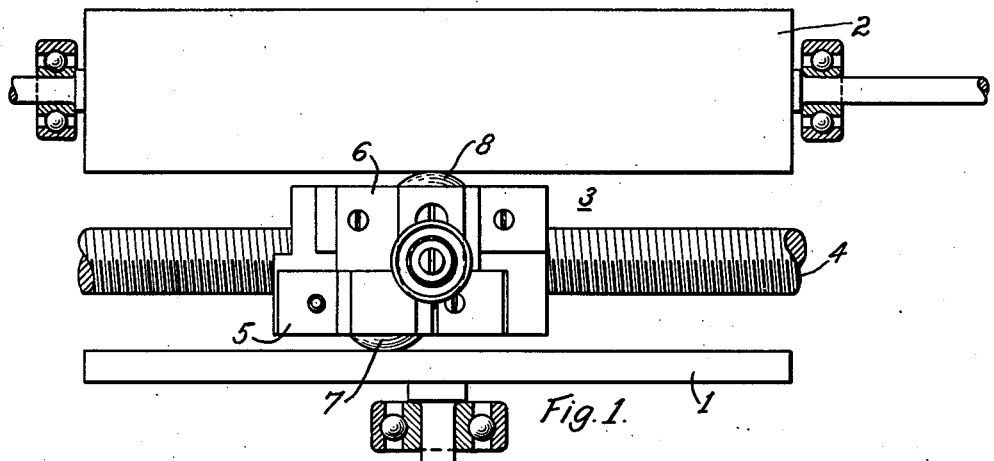
Figure 1 is a top view of a variable speed friction drive assembly embodying the principles of our invention.
Figure 2:
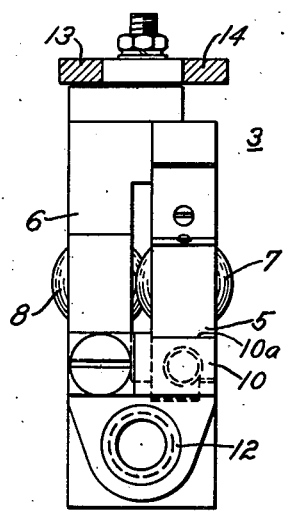
Fig. 2 is a side view of the spring-pressed ball assembly unit shown in Fig. 1.
Figure 3:
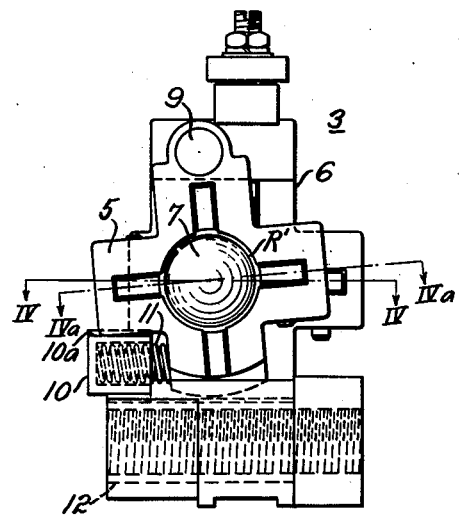
Fig. 3 is a front view of the unit shown in Fig. 2.

Referring more particularly to Figure 1, numeral 1 denotes a disk mounted for rotary motion and which may be considered the driving member, and numeral 2 denotes a revolvable cylinder which may be considered as the driven member, and numeral 3 generally denotes a spring-pressed ball assembly unit which can be propelled by rotation of the threaded shaft 4 with which it is in engagement and guided by guides 13 and 14 (see Fig. 2) so as to obtain different speed ratios of transmission between the driving and driven members. The unit 3 comprises two cages 5 and 6 having mounted therein balls 7 and 8, respectively. These balls are kept from falling out by means of the retaining rings R and R' at the outer faces of each cage. The balls are thus free to move axially of their respective cages and toward each other. Each of these balls is supported in an anti-friction manner by means of four roller bearings arranged in quadrature about the periphery of the ball, as shown in Fig. 3.

Cage 5 is pivotally mounted with respect to cage 6 by means of pin 9. At the lower portion of cage 6 there is integrally secured a recessed member 10 containing therein a spring 11 which biases cage 5 in a counterclockwise direction with respect to cage 6. This counterclockwise movement is limited by the upper surface 10a of recess member 10 which acts as a stop member against one of the wings of the cage 5.

Figure 4:
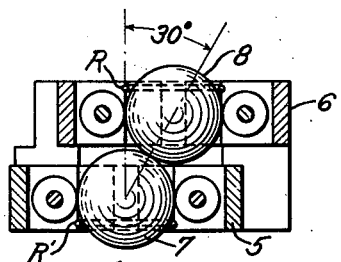
Fig. 4 is a sectional view taken along lines IV—IV and IVa—IVa of Fig. 3.

The cage 5 is offset with respect to cage 6 in two different planes. As will be apparent from Fig. 3, spring 11 causes a slight rotational offset as measured by the angle between section lines IV—IV and IVa—IVa. As will also be apparent from Fig. 3, taken together with Figs. 1 and 4, cages 5 and 6 are offset laterally to an extent such that a line drawn through the centers of the balls forms an acute angle with respect to a line perpendicular to disk 1. We have found that this acute angle is preferably of the order of 30°, as indicated in Fig. 4. It will be apparent that by placing unit 3 in Fig. 1 in such position that the contact point between ball 7 and disk 1 is located along the axis of disk 1, there will be transmission of zero speed between driving and driven members. However, as the unit 3 is propelled to the right by virtue of rotation of threaded shaft 4, the speed ratio will progressively increase, effecting progressively increasing speeds of driven member 2 in a particular direction. However, if unit 3 were moved from the disk axis towards the left, there will be a similar progressive increasing speed ratio but in an opposite direction.

It will be apparent that by our novel spring-pressed ball assembly, we are able to rigidly mount both the driving and driven members so as to allow no movement in the direction of the axis of disk 1, which is indicated by the ball bearing arrangement shown on the driving and driven members. In other words, we may start out with a fixed distance which will always be maintained between driving and driven members. When the assembly unit 3 is first inserted between this space, the distance between the outermost tips of the two balls will be greater than the fixed distance between the driving and driven members.

In order to insert the unit in place, these outermost tips are manually compressed towards each other which will effect an offsetting relationship between the balls of about 30°, as shown in Fig. 4. Under this condition, spring 11 is compressed, and the angle between section lines IV—IV and IVa—IVa is substantially zero due to the sidewise pressure (as viewed from Fig. 4), exerted by the balls on the two cages 5 and 6. When unit 3 is in place and when the manual pressure is relieved from the ball extremities, spring 11 will tilt cage 5 with respect to cage 6, as shown in Fig. 3, thereby reducing the angle to a value smaller than 30°. Spring 11 thereby maintains continuous pressure between all component parts of the drive. It will be noted that minor rotational fluctuations of cage 6 caused by spring 11 in compensating for surface irregularities allow only axial movement along the cylinder, thereby not impairing the fixed speed ratio determined by the position of unit 3. We prefer to make the entire unit 3 of a light metal, such as aluminum or certain alloy steels with the exception of the screw-threaded sleeve 12 which we prefer to make of bronze.

It will be apparent that the balls may be supported in ball bearings instead of roller bearings, as shown. It will also be apparent that member 2 could be the driving member, and member 1 the driven member, if so desired. It will also be apparent that instead of having the 30° offset between the balls in a horizontal plane, as shown, such offset can be situated equally as well in a vertical plane with suitable rearrangement of the other parts, as will be obvious.

By our novel ball assembly unit 3, we are able to secure a variable speed drive wherein it is unnecessary to apply spring means to either the disk or the cylinder, thereby eliminating coupling thereof and eliminating bulkiness of the drive, and at the same time we are able to secure a more positive drive which will maintain a more constant speed ratio of transmission.

We are, of course, aware that others, particularly after having had the benefit of the teachings of our invention, may devise other devices embodying our invention, and we, therefore, do not wish to be limited to the specific showings made in the drawing and the descriptive disclosure hereinbefore made, but wish to be limited only by the scope of the appended claims and such prior art that may be pertinent.

We claim as our invention:

1. A variable speed friction drive comprising a rigidly mounted disk shaped driving member, a rigidly mounted cylindrical driven member, and means interposed between said members for transferring motion therebetween comprising a pair of races pivotally mounted with respect to each other, each containing a ball, said balls being normally in contacting relationship along a line forming an acute angle with respect to a line perpendicular to the surface of said disk, spring means which biases one race with respect to the other so as to tend to decrease said angle, thus maintaining continuous driving engagement between said driving member, balls and driven member, and means for adjustably moving said pair of races radially of said disk thereby, obtaining variable speed ratios of transmission.

2. Apparatus as set forth in claim 1 in which each race contains a plurality of anti-friction rolling surfaces along the periphery of the ball for providing an anti-friction bearing for the ball.

3. A friction drive comprising a rigidly mounted driving member, a rigidly mounted driven member, and friction means interposed between said members for transferring motion therebetween comprising a pair of cages pivotally mounted with respect to each other, each containing a ball, said balls being normally in contacting relationship with each other along a line forming an acute angle with respect to a line perpendicular to the surface of one of said members, spring means which biases one cage in offsetting relationship with respect to the other so as to tend to decrease said angle, thus maintaining continuous driving engagement between said driving member, balls and driven member.

4. Apparatus as set forth in claim 1 in which said acute angle is approximately 30°.

5. Apparatus as set forth in claim 3 in which said acute angle is approximately 30°.

6. Apparatus as set forth in claim 3 in which each cage contains a plurality of anti-friction bearings along the periphery of the ball for providing an anti-friction support therefor.

7. Apparatus as set forth in claim 3 in which each cage contains four roller bearings arranged in quadrature along the periphery of the ball for providing an anti-friction support therefor.

8. Apparatus as set forth in claim 3 in which said spring means is mounted in a recessed member formed in one of said cages, the other surface of said recessed member acting as a stop to limit said acute angle to a predetermined maximum value.

9. Apparatus as set forth in claim 1 in which said acute angle is located substantially in a plane extending through the axes of the driving and driven members and the axes of said balls.

10. Apparatus as set forth in claim 3 in which said acute angle is located substantially in a plane extending through the axes of the driving and driven members and the axes of said balls.

JOHN S. FORSTER.
SEYMOUR W. HERWALD.